(12) United States Patent
Lee (10) Patent No.: US 9,900,292 B2
(45) Date of Patent: Feb. 20, 2018

(54) METHOD AND APPARATUS FOR PROVIDING SECURITY SERVICE FOR VEHICLE-DEDICATED DATA CHANNEL IN LINKING BETWEEN VEHICLE HEAD UNIT AND EXTERNAL DEVICE

(71) Applicant: Hyundai Motor Company, Seoul (KR)

(72) Inventor: Seung Cheol Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 170 days.

(21) Appl. No.: 15/055,066

(22) Filed: Feb. 26, 2016

(65) Prior Publication Data

US 2017/0142078 A1     May 18, 2017

(30) Foreign Application Priority Data

Nov. 17, 2015   (KR) .......................... 10-2015-0160871

(51) Int. Cl.
*H04L 29/06* (2006.01)
*H04L 29/08* (2006.01)
(Continued)

(52) U.S. Cl.
CPC .......... *H04L 63/0435* (2013.01); *H04L 63/06* (2013.01); *H04L 67/04* (2013.01);
(Continued)

(58) Field of Classification Search
CPC ......... H04L 63/04; H04L 63/06; H04L 63/12; H04L 63/061; H04L 63/0345; H04W 12/04; H04W 12/10
See application file for complete search history.

(56) References Cited

U.S. PATENT DOCUMENTS 8,819,418 B2 *   8/2014  Ando ................... H04L 9/3268
                                                            713/156
8,831,585 B2     9/2014  Nicholson et al.
(Continued)

FOREIGN PATENT DOCUMENTS

KR    10-0932274           12/2009
KR    10-1096376 B1        12/2011
(Continued)

OTHER PUBLICATIONS

Korean Notice of Allowance, dated May 18, 2017, issued in the corresponding Korean Application No. 10-2015-0160871.

*Primary Examiner* — Beemnet Dada
(74) *Attorney, Agent, or Firm* — Brinks Gilson & Lione (57) ABSTRACT

A method and apparatus for providing a security service for a vehicle-dedicated data channel in linking between a vehicle head unit and an external device is disclosed. The method of providing the security service for the vehicle-dedicated data channel may include: transmitting, to the terminal, a predetermined integrity verification request message for requesting integrity verification of application software and an operating system included in the terminal; receiving an integrity verification result message from the terminal, exchanging a plaintext symmetric key with the terminal when integrity of the operating system and the application software is successfully verified according to the integrity verification result message; and establishing a vehicle-dedicated data channel to the terminal and transmitting and receiving a packet encrypted using the plaintext symmetric key through the established vehicle-dedicated data channel when the plaintext symmetric key is successfully exchanged.

20 Claims, 9 Drawing Sheets

(51) Int. Cl.
*H04W 12/04* (2009.01)
*H04W 12/10* (2009.01)
*H04W 88/02* (2009.01)

(52) U.S. Cl.
CPC ............ *H04L 67/12* (2013.01); *H04L 67/125* (2013.01); *H04W 12/04* (2013.01); *H04W 12/10* (2013.01); *H04L 63/061* (2013.01); *H04L 63/12* (2013.01); *H04W 88/02* (2013.01)

(56) References Cited

U.S. PATENT DOCUMENTS

| | | | |
|---|---|---|---|
| 9,561,779 B2 * | 2/2017 | Rasal | B60R 25/2045 |
| 9,701,280 B2 * | 7/2017 | Schussmann | B60R 25/209 |
| 9,701,281 B2 * | 7/2017 | Reiser | B60R 25/24 |
| 9,735,838 B2 * | 8/2017 | Han, II | H04B 5/0056 |
| 9,742,771 B2 * | 8/2017 | Smith | H04L 63/10 |

FOREIGN PATENT DOCUMENTS

| | | |
|---|---|---|
| KR | 10-1118903 B1 | 3/2012 |
| KR | 10-1165350 | 7/2012 |
| KR | 10-2013-0080664 | 7/2013 |
| KR | 10-1356476 | 1/2014 |
| KR | 10-2014-0065141 | 5/2014 |
| KR | 10-2015-0060093 A | 6/2015 |
| KR | 10-2015-0089697 | 8/2015 |

* cited by examiner

METHOD AND APPARATUS FOR PROVIDING SECURITY SERVICE FOR VEHICLE-DEDICATED DATA CHANNEL IN LINKING BETWEEN VEHICLE HEAD UNIT AND EXTERNAL DEVICE

CROSS-REFERENCE TO RELATED APPLICATION

This application claims the benefit of Korean Patent Application No. 10-2015-0160871, filed on Nov. 17, 2015, which is hereby incorporated by reference in its entirety.

FIELD

The present disclosure relates to a method of providing a security service in linking between a vehicle head unit and an external device.

BACKGROUND

The statements in this section merely provide background information related to the present disclosure and may not constitute prior art.

Various technologies have recently been developed to link an external terminal (or external device), for example, a smartphone with a vehicle head unit or an audio video navigation (AVN) system installed in a vehicle.

For example, a smartphone manufacturer, Apple and an Android OS provider, Google have recently launched CarPlay and Google Android Auto, respectively, corresponding to individual standards. As a result, a user can use a display of a vehicle head unit through a second display of a smartphone by connecting the smartphone, which runs iOS or Android OS, to the vehicle head unit wirelessly or by wire.

In addition, application of MirrorLink solution led by the Car Connective Consortium has been gradually extended by several original equipment manufacturers (OEMs). In China, a function of linking a vehicle AVN system and a smartphone, which has been independently standardized by leading information technology (IT) companies such as Baidu, Tencent, etc., has been developed.

The function of linking the vehicle AVN system and the smartphone allows various applications of the smartphone to be conveniently used in the vehicle, allows applications suitable for the vehicle to be distributed through the ecosystem previously constructed by Apple/Google/Baidu, etc., and allows the applications to be frequently updated. Thus, it is possible to effectively overcome problems of the absence of the ecosystem, restriction on upgrade and connection, etc. that a conventional vehicle has had. Therefore, the function of linking the vehicle AVN system and the smartphone is expected to be a technology that can enhance marketability of a vehicle AVN system which can lag behind a conventional IT product.

Moreover, a recently released vehicle and smartphone support a vehicle-dedicated data channel for transmitting and receiving various types of vehicle-related control information and various types of information obtainable from the vehicle, for example, driving information, fuel efficiency information, breakdown information, etc.

However, the vehicle does not have a security authentication means for validating the smartphone, and thus has a problem of weak security of various control signals and data transmitted and received through the vehicle-dedicated data channel when the smartphone is hacked.

Information transmitted and received through the vehicle-dedicated data channel may include information which is fatal to vehicle security. Thus, when the information is leaked or changed, the leaked or changed information may have a fatal effect on safe driving. Therefore, use of the vehicle-dedicated data channel needs to be restricted depending on whether hacking is detected from a linkage between the vehicle AVN system and the smartphone.

More seriously, when code is counterfeited or falsified by a malicious hacker in a process of distributing SW of Apple/Google, etc., code having a potential security risk may be installed in the AVN system, and thus vehicle security risk may increase.

Figure 1:
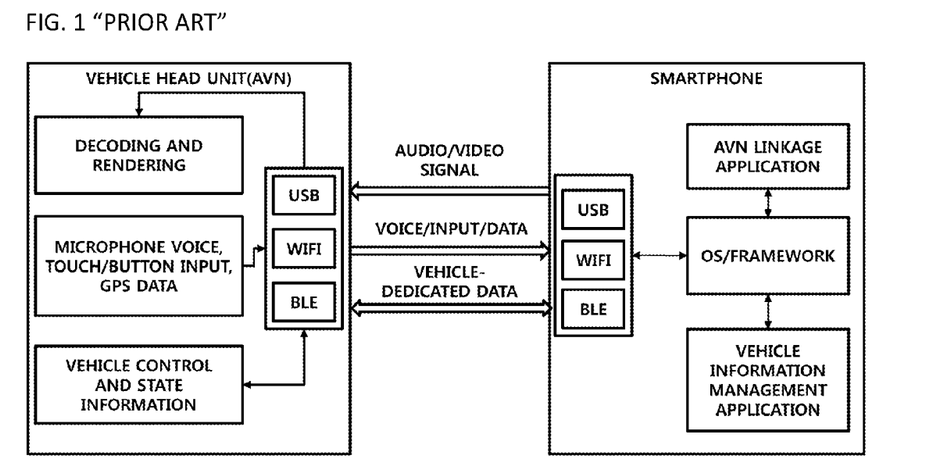
FIG. 1 is a block diagram for description of a configuration of a system for linking a smartphone and a vehicle AVN system according to the related art.

As illustrated in FIG. 1, according to a current technology of linking a smartphone and a vehicle AVN system, the smartphone and the vehicle AVN system are connected to each other using a physical communication means such as a universal serial bus (USB)/Wi-Fi/Bluetooth, and the vehicle AVN system decodes, renders, and outputs received data such as video or audio when the smartphone transmits the data. In addition, the vehicle AVN system may transmit, to the smartphone, input data input through an included input means such as a touch screen, a key button, etc., audio data for voice recognition, handoff, etc., positioning data acquired through a global positioning system (GPS) module included in the AVN system, etc. In addition, the AVN system may establish a vehicle-dedicated data channel and a particular application included in the smartphone to transmit and receive various types of vehicle control information and state information through the established vehicle-dedicated data channel. For example, the AVN system may transmit breakdown information, driving information, fuel efficiency information, etc. in a vehicle to the smartphone through the vehicle-dedicated data channel, and the smartphone may transmit various control instructions for collection of vehicle information and various control instructions for control of an operation of the vehicle such as emergency braking to the AVN system through the vehicle-dedicated data channel.

In a current linkage between a vehicle AVN system and a smartphone, while a standard is defined to validate integrity of the vehicle AVN system in terms of software or hardware in the smartphone, a standard is not yet defined to validate integrity of an operating system and software included in the smartphone in the vehicle AVN system.

In general, a vehicle head unit such as an AVN system is used in a physically controlled environment. In addition, the vehicle head unit is not continuously connected to a network, or software and firmware are not constantly updated by a user. Thus, security risk of the vehicle head unit is low when compared to a smartphone.

On the other hand, the smartphone is continuously connected to the network, and thus is continuously exposed to malicious hacking from outside. Thus, software having malicious code may be installed.

When the smartphone is hacked, a hacker may remotely control the smartphone to transmit a control instruction of emergency braking, a random operation of a steering wheel, etc. to a vehicle, thereby causing a serious problem in vehicle security.

SUMMARY

The present disclosure provides a method and apparatus for providing a security service for a vehicle-dedicated data channel in linking between a vehicle AVN system and an external terminal that substantially obviates one or more problems due to limitations and disadvantages of the related art.

The present disclosure also provides a method and apparatus for providing a security service for a vehicle-dedicated data channel in linking between a vehicle head unit and an external terminal capable of inhibiting hacking attempt through counterfeited or falsified application software and operating system by verifying integrity of the application software and the operating system included in the external terminal.

Another aspect of the present disclosure is to provide a method and apparatus for providing a security service for a vehicle-dedicated data channel in linking between a vehicle head unit and an external terminal capable of adaptively controlling use of the vehicle-dedicated data channel by detecting whether a packet is hacked, that is, whether a man in the middle (MITM) attack occurs in addition to maintaining confidentiality of vehicle security data and vehicle control instructions by encrypting a packet transmitted through the vehicle-dedicated data channel.

Technical problems to be solved by the present disclosure are not limited to the above-mentioned technical problems, and other technical problems not mentioned herein may be clearly understood by those skilled in the art from description below.

As described in the present disclosure, a method of providing a security service for a vehicle-dedicated data channel in linking with a terminal by a vehicle head unit, includes transmitting, to the terminal, a predetermined integrity verification request message for requesting integrity verification of application software and an operating system included in the terminal, receiving an integrity verification result message from the terminal, exchanging a plaintext symmetric key with the terminal when integrity of the operating system and the application software is successfully verified according to the integrity verification result message, and establishing a vehicle-dedicated data channel to the terminal and transmitting and receiving a packet encrypted using the plaintext symmetric key through the established vehicle-dedicated data channel when the plaintext symmetric key is successfully exchanged.

The exchanging may include generating a first plaintext symmetric key, encrypting the first plaintext symmetric key using a public key of the terminal to transmit the encrypted first plaintext symmetric key to the terminal, receiving the first plaintext symmetric key encrypted using a public key of the vehicle head unit, and decrypting the received first plaintext symmetric key using a private key of the vehicle head unit, wherein the plaintext symmetric key may be determined to be successfully exchanged when the generated first plaintext symmetric key is identical to the decrypted first plaintext symmetric key.

The exchanging of the plaintext symmetric key may be determined as failed when the generated first plaintext symmetric key is different from the decrypted first plaintext symmetric key, wherein establishment of the vehicle-dedicated data channel may be interrupted when the exchanging of the plaintext symmetric key fails.

Establishment of the vehicle-dedicated data channel may be interrupted when the integrity verification of at least one of the application software and the operating system fails.

The plaintext symmetric key may be generated by inputting a random value to a predetermined symmetric key generation function.

The packet transmitted and received through the vehicle-dedicated data channel may include at least one of a control instruction for controlling an operation of a vehicle including the vehicle head unit, and vehicle information collected from controllers in the vehicle.

The vehicle information may include at least one of driving information, fuel efficiency information, breakdown information, steering information, steering wheel control information, tire inflation pressure information, engine oil state information, fuel state information, and air conditioning equipment information.

When integrity of the application software is successfully verified in the terminal, integrity of the operating system may be verified by the integrity-verified application software.

The transmitting and receiving may include dividing a packet to be transmitted into blocks having predetermined sizes, generating a second plaintext symmetric key using the first plaintext symmetric key according to a predefined rule, and encrypting the respective divided blocks using the second plaintext symmetric key to generate encrypted blocks, padding the encrypted blocks with data generated by hashing the divided blocks using the first plaintext symmetric key, and transmitting the blocks.

The transmitting and receiving may include generating a second plaintext symmetric key using the first plaintext symmetric key according to a predefined rule when the packet is received through the vehicle-dedicated data channel, extracting first data by decrypting respective encrypted blocks included in the received packet using the second plaintext symmetric key, and extracting second data by decrypting padding data connected to the respective encrypted blocks using the first plaintext symmetric key, wherein man in the middle (MITM) attack may be determined to occur in the terminal when the first data is different from the second data.

The established vehicle-dedicated data channel may be canceled when the MITM attack is determined to occur.

A packet may be generated by connecting the first data extracted from the respective encrypted blocks when the first data is identical to the second data.

In another aspect of the present disclosure, a method of providing a security service for a vehicle-dedicated data channel in a terminal linked with a vehicle head unit, includes receiving an integrity verification request message from the vehicle head unit, verifying integrity of application software and an operating system included in the terminal, transmitting an integrity verification result message to the vehicle head unit, exchanging a plaintext symmetric key generated by the vehicle head unit when integrity is successfully verified, and establishing a vehicle-dedicated data channel to the vehicle head unit and transmitting and receiving a packet encrypted using the plaintext symmetric key through the established vehicle-dedicated data channel when the plaintext symmetric key is successfully exchanged.

The exchanging may include receiving a first plaintext symmetric key encrypted using a public key of the terminal from the vehicle head unit, and encrypting the first plaintext symmetric key using a public key of the vehicle head unit after decrypting the first plaintext symmetric key using a private key of the terminal, and transmitting the encrypted first plaintext symmetric key to the vehicle head unit.

Establishment of the vehicle-dedicated data channel may be interrupted when integrity verification of at least one of the application software and the operating system fails.

The transmitting and receiving may include dividing a packet to be transmitted into blocks having predetermined sizes, generating a second plaintext symmetric key using the first plaintext symmetric key according to a predefined rule, and encrypting the respective divided blocks using the second plaintext symmetric key to generate encrypted blocks, padding the encrypted blocks with data generated by hashing the divided blocks using the first plaintext symmetric key, and transmitting the blocks.

The transmitting and receiving may include generating a second plaintext symmetric key using the first plaintext symmetric key according to a predefined rule when the packet is received through the vehicle-dedicated data channel, extracting first data by decrypting respective encrypted blocks included in the received packet using the second plaintext symmetric key, and extracting second data by decrypting padding data connected to the respective encrypted blocks using the first plaintext symmetric key, wherein MITM attack may be determined to occur and the received packet may be discarded when the first data is different from the second data.

In another aspect of the present disclosure, a vehicle head unit linked with a terminal through a wired or wireless communication connection to transmit and receive a packet, includes a vehicle information provision module for transmitting, to the terminal, a predetermined integrity verification request message to verify integrity of application software and an operating system included in the terminal, exchanging a first plaintext symmetric key with the terminal based on a result of integrity verification received from the terminal, and establishing a vehicle-dedicated data channel to the terminal to transmit and receiving the packet when the first plaintext symmetric key is successfully exchanged, and an MITM attack detection module for detecting whether MITM attack occurs in a packet when the packet is received through the vehicle-dedicated data channel by decrypting the received packet using the first plaintext symmetric key and a second plaintext symmetric key modulated by the first plaintext symmetric key, wherein the received packet is discarded and the established vehicle-dedicated data channel is canceled when the MITM attack is detected to occur.

In another aspect of the present disclosure, a terminal linked with a vehicle head unit through a wired or wireless communication connection, includes an integrity verification module for verifying integrity of included application software when an integrity verification request message is received from the vehicle head unit, and a vehicle information management application for verifying integrity of an included operating system when integrity of the application software is successfully verified, transmitting a result of verifying integrity of the application software and the operating system to the vehicle head unit, and exchanging a plaintext symmetric key with the vehicle head unit, wherein a vehicle-dedicated data channel is established between the vehicle head unit and the vehicle information management application and a packet encrypted using the plaintext symmetric key is transmitted and received through the established vehicle-dedicated data channel when the plaintext symmetric key is successfully exchanged.

In another aspect of the present disclosure, it is possible to provide a computer-readable recording medium recording a program for executing any one of the methods of providing the security service for the vehicle-dedicated data channel described above.

It should be noted that the above-mentioned technical solutions are merely a part of embodiments of the present disclosure, and various embodiments reflecting technical characteristics of the present disclosure may be derived and understood by those skilled in the art from detailed description of the present disclosure given below.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The suffixes "module" and "unit" of elements herein are used for convenience of description and thus can be used interchangeably and do not have any distinguishable meanings or functions.

Although all elements constituting the embodiments of the present disclosure are described as being integrated into a single one or operated as a single one, the present disclosure is not necessarily limited to such embodiments. All of the elements may be selectively integrated into one or more and be operated as one or more within the object and scope of the present disclosure. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present disclosure pertains. The computer program may be stored in computer readable media such that the computer program is read and executed by a computer to implement embodiments of the present disclosure. Computer program storage media may include magnetic recording media, optical recording media, and carrier wave media.

The terms "comprises", "includes", and "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings in the related art from the context. Unless obviously defined in the present disclosure, such terms should not be interpreted as having ideal or excessively formal meanings.

It will be understood that, although the terms first, second, A, B, (a), (b), etc. may be used herein to describe various elements of the present disclosure, these terms are only used to distinguish one element from another element and essence, order, or sequence of corresponding elements are not limited by these terms. It will be understood that when one element is referred to as "connected to", "coupled to", or "accessing" another element, one element may be "connected to", "coupled to", or "access" another element via a further element although one element may be directly connected to or directly access another element.

In description below, a vehicle head unit may have an audio video navigation (AVN) function, and the vehicle head unit and an AVN system are interchangeable.

In addition, an external terminal according to the present disclosure may include a smartphone. For convenience of description, the external terminal, a terminal, and the smartphone are interchangeable.

In addition, application software included in the smartphone or the vehicle head unit to transmit and receive information collected from a vehicle, vehicle security-related information, a vehicle control instruction, etc. is referred to as a vehicle-dedicated application or a vehicle information management application. On the other hand, application software included in the smartphone to use the AVN function included in the vehicle head unit is referred to as an AVN linkage application to be distinguished from the vehicle-dedicated application.

Figure 2:
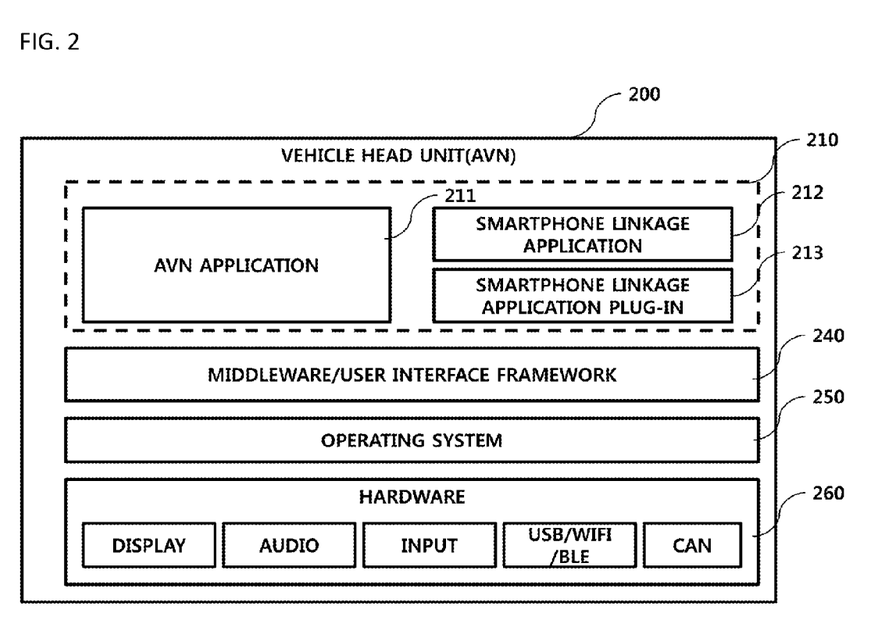
FIG. 2 is a block diagram illustrating a hierarchical structure of an AVN system implemented to provide a function of linking a vehicle AVN system and a smartphone.

FIG. 2 illustrates a hierarchical structure of an AVN system 200 implemented to provide a function of linking a vehicle AVN system and a smartphone according to an embodiment of the present disclosure.

Referring to FIG. 2, the AVN system 200 includes an application layer 210 including an AVN application 211, a smartphone linkage application 212, a smartphone linkage application plug-in 213, etc., a middleware layer 220 for providing a middleware/user interface framework 240, an operating system layer 250, a hardware layer 260, etc.

The AVN application 211 is application software for providing an AVN function, etc., and may be application software for providing various AVN functions to a user through direct control of a vehicle head unit.

The smartphone linkage application 212 may include an AVN linkage application for remotely controlling an AVN function through communication connection with the smartphone, a vehicle information provision application for collecting various types of vehicle-dedicated information from controllers included in a vehicle in real time, and transmitting the collected vehicle information to the smartphone connected by wire or wirelessly according to a predetermined control instruction received from the smartphone, etc.

In this instance, channels may be independently established for the AVN linkage application and the vehicle information provision application. In other words, the vehicle information provision application included in the AVN system 200 may transmit and receive in-vehicle information and a vehicle control instruction through a separate vehicle-dedicated data channel.

The hardware layer 260 may include an in-vehicle communication module such as a controller area network (CAN) module for communication in the vehicle, a universal serial bus (USB) port, a Wi-Fi communication module and a Bluetooth communication module for communication with an external user device, etc. in addition to a display device such as a liquid crystal display (LCD) for control of the AVN function, an audio device such as a speaker, and an input device such as a key button and a jog wheel.

The AVN system may collect various types of vehicle state information through in-vehicle communication. Examples of vehicle state information may include driving information, fuel efficiency information, breakdown information, steering information, steering wheel control information, tire inflation pressure information, engine oil state information, fuel state information, air conditioning equipment information, etc. However, the present disclosure is not limited thereto, and it is possible to include all information collectable from various controllers included in the vehicle.

Figure 3:
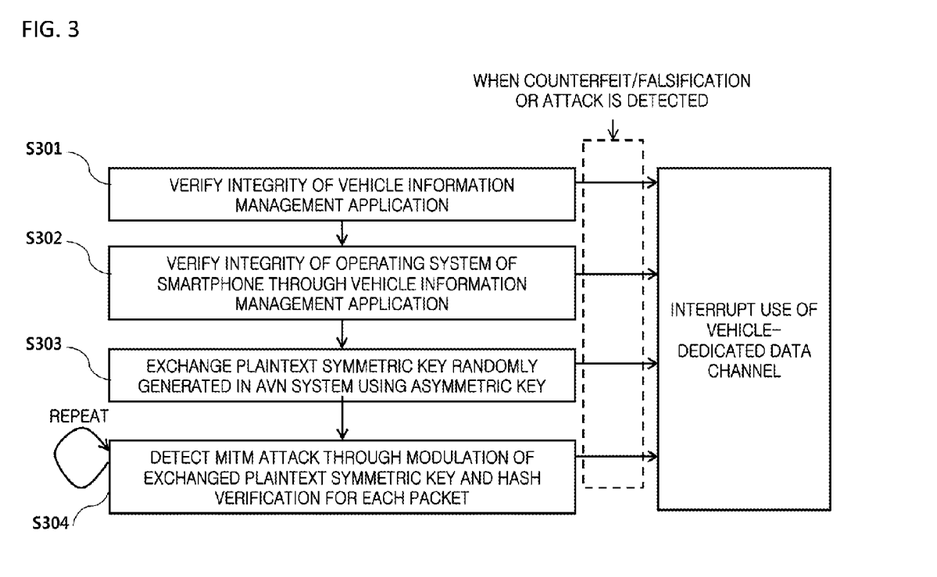
FIG. 3 is a diagram for description of a method of providing a security service for a vehicle-dedicated data channel in linking between a vehicle head unit and an external terminal.

FIG. 3 is a diagram for description of a method of providing a security service for a vehicle-dedicated data channel in linking between a vehicle AVN system and a smartphone according to an embodiment of the present disclosure.

Referring to FIG. 3, in S301, when connection of the smartphone is verified, an AVN system may perform an integrity verification procedure for a vehicle information management application included in the smartphone.

When integrity of the vehicle information management application is successfully verified, the AVN system may perform an integrity verification procedure for an operating system included in the smartphone through the verified vehicle information management application in S302.

When integrity verification for the vehicle information management application fails in S301, the AVN system may interrupt use of the vehicle-dedicated data channel by the smartphone.

In addition, when integrity verification for the operating system included in the smartphone fails in S302, the AVN system may interrupt use of the vehicle-dedicated data channel by the smartphone.

When integrity of the operating system is successfully verified in S302, the AVN system may perform a procedure of exchanging a plaintext symmetric key randomly generated in the AVN system using an asymmetric key in S303. Here, the asymmetric key used in the AVN system may include a smartphone public key and an AVN private key maintained in the AVN system. On the other hand, an asymmetric key used for the procedure of exchanging the plaintext symmetric key in the smartphone may include an AVN public key and a smartphone private key. The procedure of exchanging the plaintext symmetric key will be described in detail with reference to FIG. 5.

When the AVN system successfully exchanges the plaintext symmetric key, the AVN system may establish a vehicle-dedicated data channel to the smartphone, and transmit and receive data through the established vehicle-dedicated data channel. In this instance, a packet transmitted through the vehicle-dedicated data channel is encrypted and transmitted at a transmitting end. In S304, a receiving end may decrypt the received packet to detect MITM attack.

In particular, the AVN system may encrypt a packet to be transmitted by modulating the exchanged plaintext symmetric key in real time, and then transmit the encrypted packet to the smartphone through the vehicle-dedicated data channel. In addition, upon reception of a packet through the vehicle-dedicated data channel, the AVN system may decrypt the received packet by modulating the exchanged plaintext symmetric key in real time, and detect MITM attack through hash validation of each packet. Detection of MITM attack through hash validation of each packet may become clearer through description below with reference to FIG. 6 to FIG. 9.

When MITM attack is detected in S304, the AVN system may block use of or cancel the established vehicle-dedicated data channel.

Figure 4:
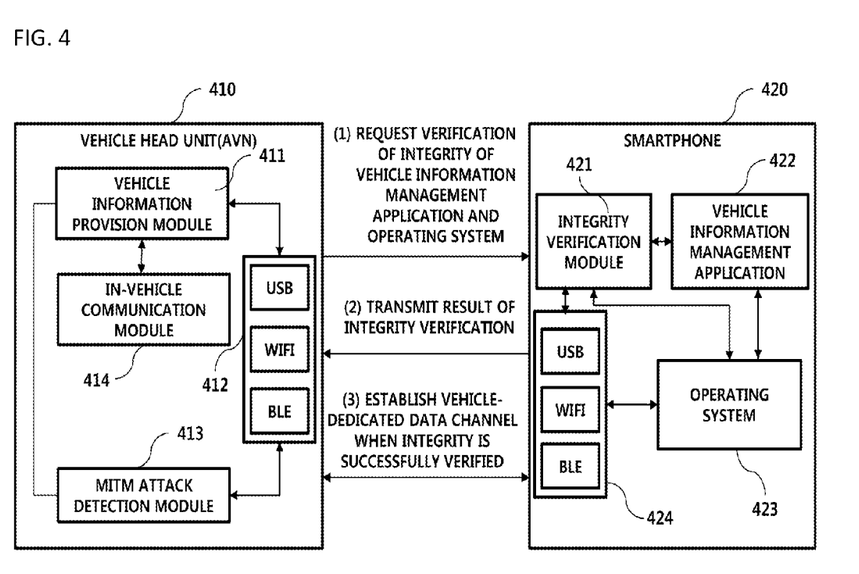
FIG. 4 is a block diagram for description of an integrity verification procedure for application software and an operating system included in a smartphone.

FIG. 4 is a diagram for description of an integrity verification procedure for application software and an operating system 423 included in a smartphone 420.

Referring to FIG. 4, a vehicle head unit 410 includes a vehicle information provision module 411, an external communication module 412, an MITM attack detection module 413, an in-vehicle communication module 414, etc.

The smartphone 420 may include an integrity verification module 421, a vehicle information management application 422, the operating system 423, and a communication module 424.

Upon confirming connection of the smartphone 420, the vehicle information provision module 411 may transmit an integrity verification request message to verify integrity of the vehicle information management application 422 and the operating system 423 to the smartphone 420.

The communication module 424 of the smartphone 420 may transmit the received integrity verification request message to the integrity verification module 421 directly or through the operating system 423.

The integrity verification module 421 may verify integrity of the vehicle information management application 422.

When integrity of the vehicle information management application 422 is successfully verified, the integrity verification module 421 may perform a control operation such that the vehicle information management application 422 verifies integrity of the operating system 423.

The vehicle information management application 422 may verify integrity of the operating system 423, and transmit a result of integrity verification to the vehicle head unit 410 through the operating system 423 and/or the communication module 424.

When integrity verification of the vehicle information management application 422 fails, the integrity verification module 421 may transmit a predetermined integrity verification result message indicating that the vehicle information management application 422 is invalid to the vehicle head unit 410 through the operating system 423 and/or the communication module 424.

The vehicle information provision module 411 may verify whether the vehicle information management application 422 and/or the operating system 423 is valid based on the integrity verification result message received through the external communication module 412.

When the vehicle information provision module 411 confirms that the vehicle information management application 422 and the operating system 423 are valid, the vehicle information provision module 411 may establish a vehicle-dedicated data channel to the vehicle information management application 422, and transmit and receive a packet through the established vehicle-dedicated data channel.

When the vehicle information provision module 411 confirms that at least one of the vehicle information management application 422 and the operating system 423 is invalid, the vehicle information provision module 411 may interrupt establishment of the vehicle-dedicated data channel to the smartphone 420.

Upon reception of an encrypted packet from the external communication module 412, the MITM attack detection module 413 may decrypt the packet and detect MITM attack based on the decrypted packet.

When MITM attack is detected, the MITM attack detection module 413 may transmit a predetermined hacking occurrence report message indicating that hacking occurs to the vehicle information provision module 411. In this instance, the vehicle information provision module 411 may cancel the established vehicle-dedicated data channel according to the hacking occurrence report message.

When MITM attack is not detected, the MITM attack detection module 413 may deliver the decrypted packet to the vehicle information provision module 411.

The vehicle information provision module 411 may encrypt various types of vehicle information collected through the in-vehicle communication module 414 according to a predetermined control instruction received from the vehicle information management application 422, and then transmit the encrypted information to the vehicle information management application 422 through the external communication module 412. In this instance, a channel used for transmission of the vehicle information corresponds to the above-described vehicle-dedicated data channel.

Figure 5:
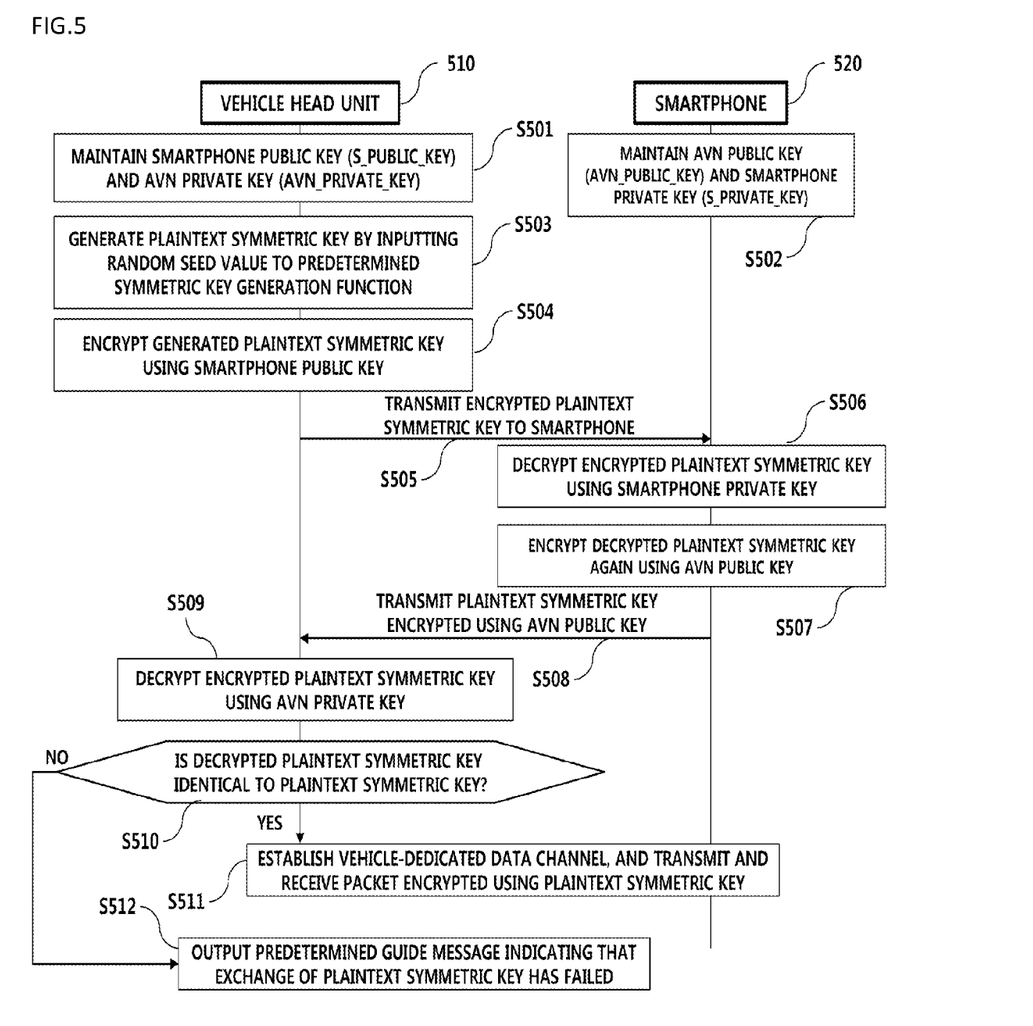
FIG. 5 is a flowchart illustrating a procedure of exchanging a plaintext symmetric key to be used for encryption of a vehicle-dedicated data channel.

FIG. 5 illustrates a procedure of exchanging a plaintext symmetric key to be used for encryption of a vehicle-dedicated data channel according to an embodiment of the present disclosure.

Referring to FIG. 5, in S501 and S502, a smartphone public key (S_public_key) and an AVN private key (AVN_private_key) may be maintained in a vehicle head unit 510, and an AVN public key (AVN_public_key) and a smartphone private key (S_private_key) may be maintained in a smartphone 520.

In S503, the vehicle head unit 510 may generate the plaintext symmetric key by inputting a random seed value to a predetermined symmetric key generation function. Here, a length of the plaintext symmetric key may be 128 bits. However, the present disclosure is not limited thereto.

In S504 and S505, the vehicle head unit 510 may encrypt the generated plaintext symmetric key using the smartphone public key, and then transmit the encrypted plaintext symmetric key to the smartphone 520.

In S506 to S508, the smartphone 520 may decrypt the encrypted plaintext symmetric key using the smartphone private key, encrypt the decrypted plaintext symmetric key again using the AVN public key, and transmit the encrypted plaintext symmetric key to the vehicle head unit 510.

In S509 and S510, the vehicle head unit 510 may decrypt the plaintext symmetric key, which is encrypted using the AVN public key, using the AVN private key, and verify whether the decrypted plaintext symmetric key is identical to the plaintext symmetric key generated in S503.

When the decrypted plaintext symmetric key is identical to the plaintext symmetric key generated in S503 as a result of verification, the vehicle head unit 510 may establish the vehicle-dedicated data channel, and transmit and receive a packet encrypted using the exchanged plaintext symmetric key in S511.

When the decrypted plaintext symmetric key is not identical to the plaintext symmetric key generated in S503 as a result of verification in S510, the vehicle head unit 510 may determine that exchange of the plaintext symmetric key has failed, and output a predetermined guide message indicating that exchange of the plaintext symmetric key has failed in S512.

Figure 6:
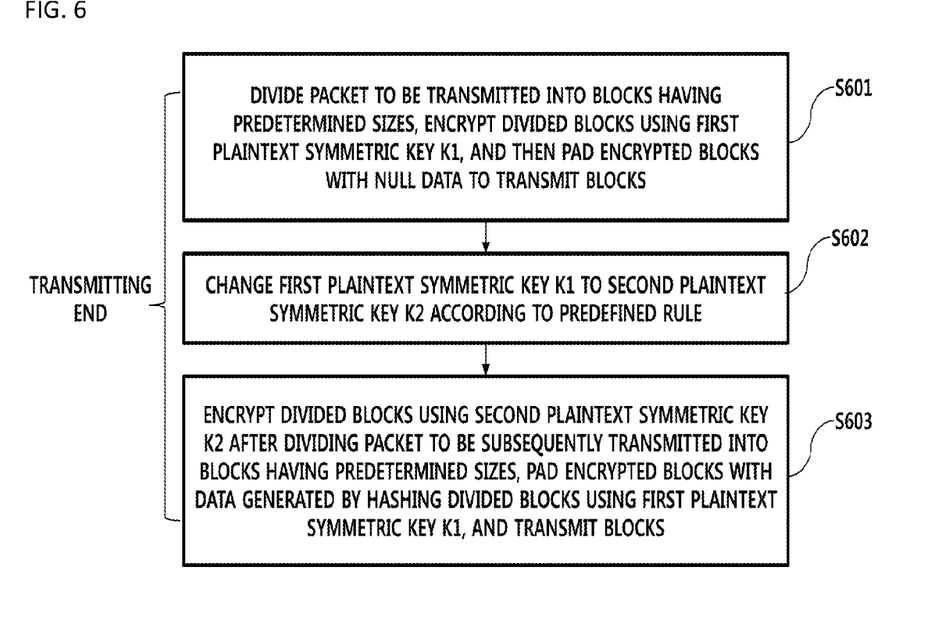
FIGS. 6 and 7 are flowcharts for description of a method of encrypting and transmitting a packet to be transmitted at a transmitting end.
Figure 7:
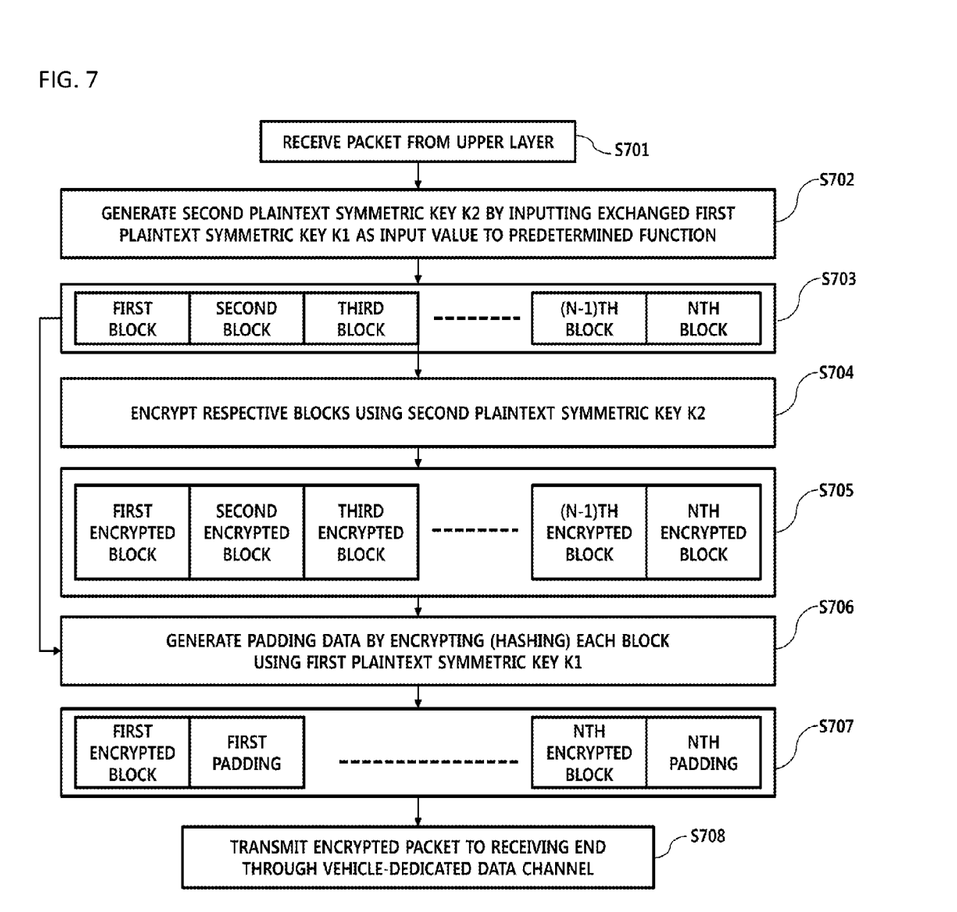

FIGS. 6 and 7 are diagrams for description of a method of encrypting and transmitting a packet to be transmitted at a transmitting end according to an embodiment of the present disclosure.

Referring to FIG. 6, in S601, the transmitting end may divide a packet to be initially transmitted into blocks having predetermined sizes, encrypt the divided blocks using a first plaintext symmetric key K1, and then pad the encrypted blocks with null data to transmit the blocks. Here, the transmitting end may correspond to a vehicle head unit or a smartphone.

In S602, the transmitting end may change the first plaintext symmetric key K1 to a second plaintext symmetric key K2 according to a predefined rule. In other words, the transmitting end may change a plaintext symmetric key in real time based on the predefined rule each time a packet is transmitted. For example, the second plaintext symmetric key K2 may be obtained by inputting the first plaintext symmetric key K1 to a predetermined symmetric key generation function.

In S603, after dividing a packet to be subsequently transmitted into blocks having predetermined sizes, the transmitting end may encrypt the divided blocks using the second plaintext symmetric key K2, pad rears of the blocks encrypted using the second plaintext symmetric key K2 with data generated by hashing the divided blocks using the first plaintext symmetric key K1, and transmit the blocks.

The packet encryption procedure at the transmitting end of FIG. 6 will be described in detail with reference to FIG. 7.

Referring to FIG. 7, in S701 and S702, upon reception of a packet from an upper layer, the transmitting end may generate the second plaintext symmetric key K2 by inputting the previously exchanged first plaintext symmetric key K1 as an input value to a predetermined function.

In S703 and S704, the transmitting end may divide the received packet into n blocks having predetermined lengths, and encrypt the respective blocks using the second plaintext symmetric key K2.

For example, each of the blocks may have the same length as that of the second plaintext symmetric key K2, and a block encrypted by performing an exclusive OR operation on a block and the second plaintext symmetric key K2 may be generated. However, it should be noted that this is merely an example, and another encryption scheme may be applied.

The transmitting end may generate padding data by encrypting (hashing) each block using the first plaintext symmetric key K1 in S706, and generate an encrypted packet by inserting the generated padding data into each of the encrypted blocks generated in S704 and S705 as illustrated in S707.

In S708, the transmitting end may transmit the encrypted packet to a receiving end through a vehicle-dedicated data channel established in advance.

Figure 8:
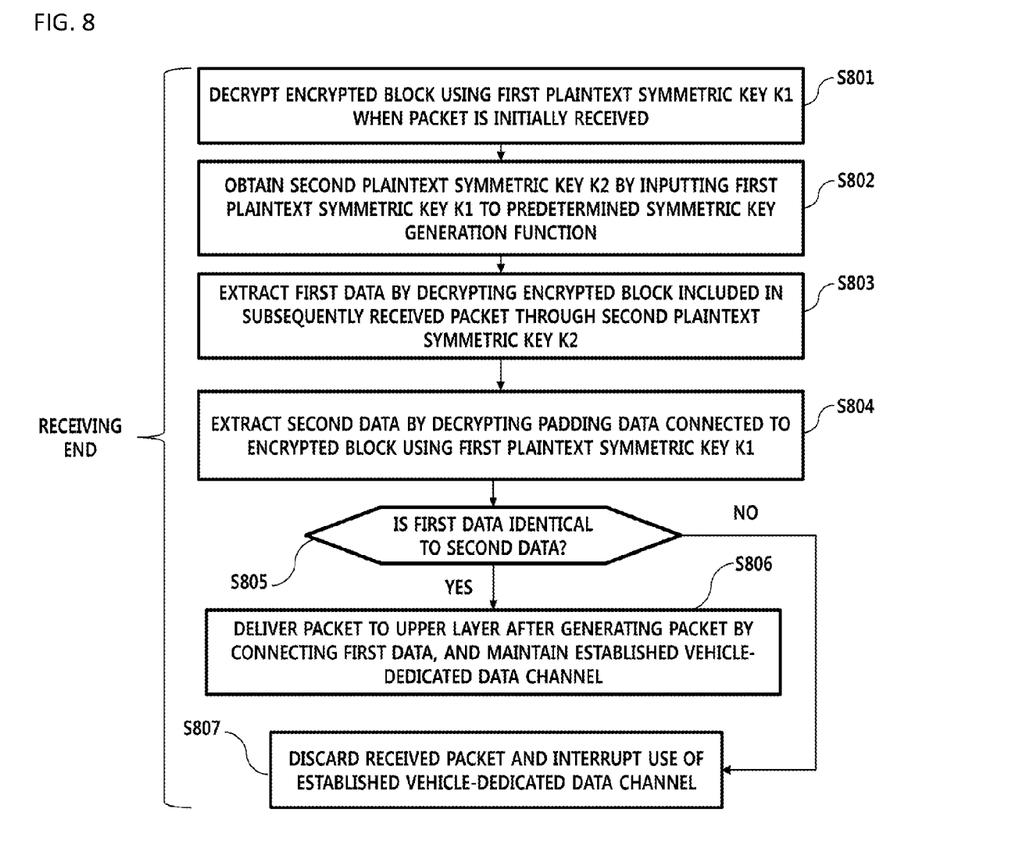
FIGS. 8 and 9 are diagrams for description of a method of decrypting a packet received by a receiving end.
Figure 9:
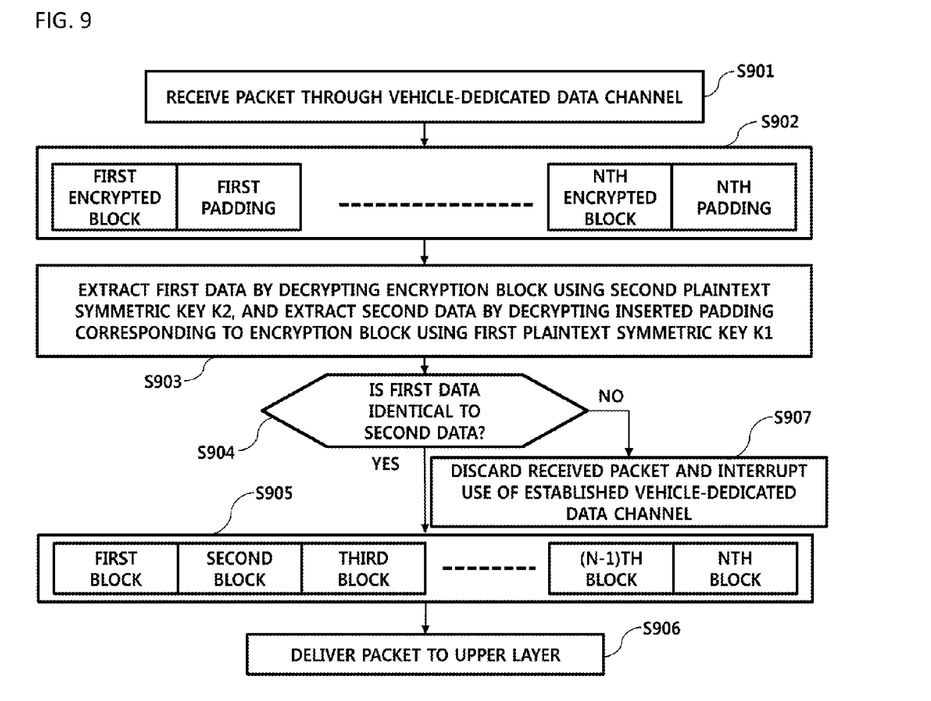

FIGS. 8 and 9 are diagrams for description of a method of decrypting a packet received by a receiving end according to an embodiment of the present disclosure.

Referring to FIG. 8, when a packet is initially received through a vehicle-dedicated data channel, the receiving end may extract an encrypted block from the received packet, and decrypt the extracted block using a previously exchanged first plaintext symmetric key K1 in S801. Here, the receiving end may correspond to a vehicle head unit or a smartphone.

In S802 and S803, the receiving end may obtain a second plaintext symmetric key K2 by inputting the first plaintext symmetric key K1 to a predetermined symmetric key generation function, and extract first data by decrypting an encrypted block of a subsequently received packet through the second plaintext symmetric key K2. As an example, the symmetric key generation function may correspond to a shift register having a predetermined length, and a new plaintext symmetric key may be generated when a value stored in the shift register is cyclic-shifted by 1 bit each time a packet is received. In other words, a plaintext symmetric key may be modulated each time a packet is transmitted and received, and thus security of the vehicle-dedicated data channel may be strengthened. As another example, the receiving end may modulate the second plaintext symmetric key K2 using the first plaintext symmetric key K1 according to a predefined rule.

In S804, the receiving end may extract second data by decrypting padding data connected to the encrypted block using the first plaintext symmetric key K1.

Subsequently, the receiving end may verify whether the first data is identical to the second data in S805.

When the first data is identical to the second data as a result of verification, the receiving end may generate a packet by connecting the first data, and then deliver the generated packet to an upper layer in S806. In this instance, the established vehicle-dedicated data channel may be maintained.

When the first data is not identical to the second data as a result of verification in S805, the receiving end may discard the packet and interrupt use of the established vehicle-dedicated data channel in S807. For example, when the first data is not identical to the second data, the receiving end may determine that MITM attack occurs at an end of an operating system of the smartphone, and cancel the established vehicle-dedicated data channel.

Hereinafter, the packet decryption procedure at the receiving end of FIG. 8 will be described in detail with reference to FIG. 9.

Referring to FIG. 9, in S901 to S903, upon reception of a packet through a vehicle-dedicated data channel, the receiving end may extract an encryption block included in the received packet, extract first data by decrypting the extracted encryption block using a second plaintext symmetric key K2, and extract second data by decrypting inserted padding corresponding to the encryption block using a first plaintext symmetric key K1.

In S904, the receiving end may verify whether the first data is identical to the second data.

When the first data is identical to the second data as a result of verification, the receiving end may remove the inserted padding for each encryption block, generate a packet connected to the first data, and then deliver the generated packet to an upper layer in S905 and S906. In this instance, the established vehicle-dedicated data channel may be maintained.

When the first data is not identical to the second data as a result of verification in S904, the receiving end may discard the received packet and interrupt use of the established vehicle-dedicated data channel in S907. For example, when the first data is not identical to the second data, the receiving end may determine that MITM attack occurs at an end of an operating system of the smartphone, and cancel the established vehicle-dedicated data channel.

Effects of the method and apparatus according to the present disclosure are described below.

The present disclosure has an advantage of providing a method and apparatus for providing a security service for a vehicle-dedicated data channel in linking between a vehicle head unit and an external terminal.

In addition, the present disclosure has an advantage of providing a method and apparatus for providing a security service for a vehicle-dedicated data channel in linking between a vehicle head unit and an external terminal capable of inhibiting hacking attempt through counterfeit or falsified application software and operating systems by verifying integrity of the application software and the operating system included in the external terminal.

In addition, the present disclosure has an advantage of providing a method and apparatus for providing a security service for a vehicle-dedicated data channel in linking between a vehicle head unit and an external terminal capable of detecting whether a packet has been hacked, that is, whether an MITM attack occurs in addition to maintaining confidentiality of vehicle security data by encrypting a packet transmitted through the vehicle-dedicated data channel.

Effects that may be obtained from the present disclosure are not limited to the above-mentioned effects, and other effects not mentioned herein may be clearly understood by those skilled in the art from the above description.

Those skilled in the art will appreciate that the present disclosure may be carried out in other specific ways than those set forth herein without departing from the spirit and essential characteristics of the present disclosure.

The above exemplary embodiments are therefore to be construed in all aspects as illustrative and not restrictive. The scope of the present disclosure should be determined by the appended claims and their legal equivalents, not by the above description, and all changes coming within the meaning and equivalency range of the appended claims are to be embraced therein.

What is claimed is:

1. A method of providing a security service for a vehicle-dedicated data channel in linking with a terminal by a vehicle head unit, the method comprising:
transmitting, to the terminal, a predetermined integrity verification request message for requesting integrity verification of application software and an operating system included in the terminal;
receiving an integrity verification result message from the terminal;
exchanging a plaintext symmetric key with the terminal when integrity of the operating system and the application software is successfully verified according to the integrity verification result message; and
establishing a vehicle-dedicated data channel to the terminal, and transmitting and receiving a packet encrypted using the plaintext symmetric key through the established vehicle-dedicated data channel when the plaintext symmetric key is successfully exchanged.

2. The method according to claim 1, wherein the exchanging includes:
generating a first plaintext symmetric key;
encrypting the first plaintext symmetric key using a public key of the terminal to transmit the encrypted first plaintext symmetric key to the terminal;
receiving the first plaintext symmetric key encrypted using a public key of the vehicle head unit; and
decrypting the received first plaintext symmetric key using a private key of the vehicle head unit,
wherein the plaintext symmetric key is determined to be successfully exchanged when the generated first plaintext symmetric key is identical to the decrypted first plaintext symmetric key.

3. The method according to claim 2, wherein the exchanging of the plaintext symmetric key is determined to fail when the generated first plaintext symmetric key is different from the decrypted first plaintext symmetric key,
wherein establishment of the vehicle-dedicated data channel is interrupted when the exchanging of the plaintext symmetric key fails.

4. The method according to claim 3, wherein the establishment of the vehicle-dedicated data channel is interrupted when the integrity verification of at least one of the application software and the operating system fails.

5. The method according to claim 2, wherein the plaintext symmetric key is generated by inputting a random value to a predetermined symmetric key generation function.

6. The method according to claim 1, wherein the packet transmitted and received through the vehicle-dedicated data channel includes at least one of a control instruction configured to control an operation of a vehicle including the vehicle head unit, and vehicle information collected from controllers in the vehicle.

7. The method according to claim 6, wherein the vehicle information includes at least one of driving information, fuel efficiency information, breakdown information, steering information, steering wheel control information, tire inflation pressure information, engine oil state information, fuel state information, or air conditioning equipment information.

8. The method according to claim 1, wherein, when the integrity of the application software is successfully verified in the terminal, the integrity of the operating system is verified by the integrity-verified application software.

9. The method according to claim 2, wherein the transmitting and receiving includes:
dividing a packet to be transmitted into blocks having predetermined sizes;
generating a second plaintext symmetric key using the first plaintext symmetric key according to a predefined rule; and
encrypting the respective divided blocks using the second plaintext symmetric key to generate encrypted blocks, padding the encrypted blocks with data generated by hashing the divided blocks using the first plaintext symmetric key, and transmitting the blocks.

10. The method according to claim 2, wherein the transmitting and receiving includes:
generating a second plaintext symmetric key using the first plaintext symmetric key according to a predefined rule when the packet is received through the vehicle-dedicated data channel;
extracting first data by decrypting respective encrypted blocks included in the received packet using the second plaintext symmetric key; and
extracting second data by decrypting padding data connected to the respective encrypted blocks using the first plaintext symmetric key,
wherein an man in the middle (MITM) attack is determined to occur in the terminal when the first data is different from the second data.

11. The method according to claim 10, wherein the established vehicle-dedicated data channel is canceled when the MITM attack is determined to occur.

12. The method according to claim 10, wherein a packet is generated by connecting the first data extracted from the respective encrypted blocks when the first data is identical to the second data.

13. A method of providing a security service for a vehicle-dedicated data channel in a terminal linked with a vehicle head unit, the method comprising:
receiving an integrity verification request message from the vehicle head unit;
verifying integrity of application software and an operating system included in the terminal;
transmitting an integrity verification result message to the vehicle head unit;
exchanging a plaintext symmetric key generated by the vehicle head unit when the integrity of the application software and the operating system is successfully verified; and
establishing a vehicle-dedicated data channel to the vehicle head unit, and transmitting and receiving a packet encrypted using the plaintext symmetric key through the established vehicle-dedicated data channel when the plaintext symmetric key is successfully exchanged.

14. The method according to claim 13, wherein the exchanging includes:
receiving a first plaintext symmetric key encrypted using a public key of the terminal from the vehicle head unit; and
encrypting the first plaintext symmetric key using a public key of the vehicle head unit after decrypting the first plaintext symmetric key using a private key of the terminal, and transmitting the encrypted first plaintext symmetric key to the vehicle head unit.

15. The method according to claim 13, wherein establishment of the vehicle-dedicated data channel is interrupted when the integrity verification of at least one of the application software and the operating system fails.

16. The method according to claim 14, wherein the transmitting and receiving includes:
dividing a packet to be transmitted into blocks having predetermined sizes;
generating a second plaintext symmetric key using the first plaintext symmetric key according to a predefined rule; and
encrypting the respective divided blocks using the second plaintext symmetric key to generate encrypted blocks, padding the encrypted blocks with data generated by hashing the divided blocks using the first plaintext symmetric key, and transmitting the blocks.

17. The method according to claim 14, wherein the transmitting and receiving includes:
generating a second plaintext symmetric key using the first plaintext symmetric key according to a predefined rule when the packet is received through the vehicle-dedicated data channel;
extracting first data by decrypting respective encrypted blocks included in the received packet using the second plaintext symmetric key; and
extracting second data by decrypting padding data connected to the respective encrypted blocks using the first plaintext symmetric key,
wherein an man in the middle (MITM) attack is determined to occur and the received packet is discarded when the first data is different from the second data.

18. A vehicle system comprising:
a vehicle head unit linked with a terminal through a wired or wireless communication connection to transmit and receive a packet, the vehicle head unit comprising:
a vehicle information provision module configured to transmit, to the terminal, a predetermined integrity verification request message to verify integrity of application software and an operating system included in the terminal, and configured to exchange a first plaintext symmetric key with the terminal based on a result of the integrity verification received from the terminal, and the vehicle information provision module configured to establish a vehicle-dedicated data channel to the terminal to transmit and receive the packet when the first plaintext symmetric key is successfully exchanged; and
an MITM attack detection module configured to detect whether an MITM attack occurs in the packet when the packet is received through the vehicle-dedicated data channel by decrypting the received packet using the first plaintext symmetric key and a second plaintext symmetric key modulated by the first plaintext symmetric key,
wherein the received packet is discarded and the established vehicle-dedicated data channel is canceled when the MITM attack is detected to occur.

19. A system comprising:
a terminal linked with a vehicle head unit through a wired or wireless communication connection, the terminal comprising:
an integrity verification module configured to verify integrity of application software when an integrity verification request message is received from the vehicle head unit; and
a vehicle information management application configured to verify integrity of an included operating system when the integrity of the application software is successfully verified, and configured to transmit a result of verifying integrity of the application software and the operating system to the vehicle head unit, and the vehicle information management application configured to exchange a plaintext symmetric key with the vehicle head unit,
wherein a vehicle-dedicated data channel is established between the vehicle head unit and the vehicle information management application, and a packet encrypted using the plaintext symmetric key is transmitted and received through the established vehicle-dedicated data channel when the plaintext symmetric key is successfully exchanged.

20. A non-transitory computer-readable recording medium recording a program configured to execute a method of providing a security service for a vehicle-dedicated data channel in linking with a terminal by a vehicle head unit, the method comprising:
transmitting, to the terminal, a predetermined integrity verification request message for requesting integrity verification of application software and an operating system included in the terminal;
receiving an integrity verification result message from the terminal;
exchanging a plaintext symmetric key with the terminal when integrity of the operating system and the application software is successfully verified according to the integrity verification result message; and
establishing a vehicle-dedicated data channel to the terminal, and transmitting and receiving a packet encrypted using the plaintext symmetric key through the established vehicle-dedicated data channel when the plaintext symmetric key is successfully exchanged.

* * * * *